United States Patent
Jung et al.

(10) Patent No.: US 10,051,162 B2
(45) Date of Patent: Aug. 14, 2018

(54) SECURITY CAMERA

(71) Applicant: HANWHA TECHWIN CO., LTD., Changwon-si (KR)

(72) Inventors: Woondo Jung, Changwon-si (KR); Jiseok Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 844 days.

(21) Appl. No.: 14/538,268

(22) Filed: Nov. 11, 2014

(65) Prior Publication Data

US 2015/0358511 A1    Dec. 10, 2015

(30) Foreign Application Priority Data

Jun. 9, 2014    (KR) .................. 10-2014-0069576

(51) Int. Cl.
| | | |
|---|---|---|
| *H04N 5/225* | (2006.01) | |
| *G03B 17/55* | (2006.01) | |
| *H04N 7/18* | (2006.01) | |
| *H04N 5/33* | (2006.01) | |
| *G08B 13/196* | (2006.01) | |

(52) U.S. Cl.
CPC ........... *H04N 5/2252* (2013.01); *G03B 17/55* (2013.01); *G08B 13/196* (2013.01); *H04N 5/2254* (2013.01); *H04N 5/2256* (2013.01); *H04N 5/33* (2013.01); *H04N 7/183* (2013.01)

(58) Field of Classification Search
CPC .... H04N 5/2252; H04N 7/183; H04N 5/2254; G03B 17/55
USPC .................................................. 348/143, 148
See application file for complete search history.

(56) References Cited

U.S. PATENT DOCUMENTS

| | | | | |
|---|---|---|---|---|
| 4,414,576 A | * | 11/1983 | Randmae | H04N 5/2252 219/201 |
| 5,966,176 A | * | 10/1999 | Chow | G08B 13/19632 348/143 |
| 6,375,369 B1 | * | 4/2002 | Schneider | G03B 17/02 348/143 |
| 2003/0030748 A1 | * | 2/2003 | Jung | G08B 13/19619 348/373 |
| 2003/0093805 A1 | * | 5/2003 | Gin | G08B 13/19619 725/105 |
| 2004/0042783 A1 | * | 3/2004 | Diana | F16M 11/10 396/427 |
| 2006/0098117 A1 | * | 5/2006 | Kajihara | H04N 5/2251 348/373 |
| 2010/0067894 A1 | * | 3/2010 | Arbuckle | G08B 13/19619 396/419 |

(Continued)

FOREIGN PATENT DOCUMENTS

| | | |
|---|---|---|
| JP | 2009-200912 A | 9/2009 |
| JP | 2011-61442 A | 3/2011 |
| JP | 2011-124784 A | 6/2011 |

*Primary Examiner* — On S Mung
(74) *Attorney, Agent, or Firm* — Sughrue Mion, PLLC

(57) ABSTRACT

A security camera including: an image pickup unit which is configured to capture an image; a controller which is connected to the image pickup unit and configured to process the image captured by the image pickup unit; a first heat generating frame which is installed to contact a surface of the controller; and a second heat generating frame which is arranged to face the first heat generating frame and is installed to contact another surface of the controller.

20 Claims, 11 Drawing Sheets

(56) References Cited

U.S. PATENT DOCUMENTS

2011/0286735 A1\* 11/2011 Tremblay ............. H04N 5/2252
396/427
2014/0267715 A1\* 9/2014 Kemege ............. G02B 27/0006
348/143

\* cited by examiner

SECURITY CAMERA

CROSS-REFERENCE TO THE RELATED APPLICATION

This application claims priority from Korean Patent Application No. 10-2014-0069576, filed on Jun. 9, 2014, in the Korean Intellectual Property Office, the disclosure of which is incorporated herein in its entirety by reference.

BACKGROUND

1. Field

Apparatuses consistent with exemplary embodiments of the inventive concept relate to a security camera.

2. Description of the Related Art

A security camera is a device installed at various locations for surveillance of a particular area or objects. In such a security camera, various devices and circuit boards may be installed. Here, various methods may be used to exhaust heat generated by such devices or circuit boards. For example, heat generated by a device or a circuit board may be exhausted to outside by using a fan or flow holes via which the air flow may be formed in a housing.

SUMMARY

Various exemplary embodiments of the inventive concept provide security cameras.

Various aspects of the exemplary embodiments will be set forth in part in the description which follows and, in part, will be apparent from the description, or may be learned by practice of the presented embodiments.

According to an aspect of an exemplary embodiment, there is provided a security camera which may include: an image pickup unit which is configured to capture an image; a controller which is connected to the image pickup unit and configured to process the image captured by the image pickup unit; a first heat generating frame which is installed to contact a surface of the controller; and a second heat generating frame which is arranged to face the first heat generating frame and is installed to contact another surface of the controller.

The second heat generating frame may include an assembly groove, which is formed by recessing a portion of the second heat generating frame, to allow a hand of a worker or an assembly tool to be inserted.

One of the first heat generating frame and the second heat generating frame may include an insertion unit, which is formed to protrude toward the other one of the first heat generating frame and the second heat generating frame; and the other one of the first heat generating frame and the second heat generating frame may include an accommodating unit, into which a portion of the insertion unit is inserted and accommodated.

The insertion unit may be formed to have a tapered shape.

The accommodation unit may be formed to have a hole-like shape into which the insertion unit is to be inserted, and a size of the insertion unit is different from a size of the accommodating unit.

At least one of the first heat generating frame and the second heat generating frame may include a heat generating pin protruding from a surface of at least one of the first heat generating frame and the second heat generating frame, respectively.

The security camera may further include a housing, which is installed to surround the first heat generating frame and the second heat generating frame.

An outer surface of a portion of the first heat generating frame and an inner surface of the housing and/or an outer surface of a portion of the second heat generating frame and the inner surface of the housing may be formed to be similar to one another, such that at least one of a distance between the housing and the portion of the first heat generating frame and a distance between the housing and the portion of the second heat generating frame is constant.

The housing may include a supporting housing, which is installed to be fixed to an outer surface of the housing; and a cover housing which is combined with the supporting housing.

The supporting housing may include a fixing protrusion into which a portion of the heat generating frame is inserted and fixed.

The supporting housing may include a guiding protrusion which guides movement of the heat generating frame when the supporting housing and the heat generating frame are assembled.

The housing further may include a sun shield which is slidably installed on the cover housing.

The housing further may include a sun shield fixing unit which is selectively combined with the sun shield and the cover housing and restrict movement of the sun shield.

The second heat generating frame may be installed to be fixed to the housing and may support the controller.

A hole may be formed to penetrate through at least one of the first heat generating frame and the second heat generating frame, and at least one of the first heat generating frame and the second heat generating frame may include a rib formed across the hole.

The security camera may further include a thermal pad which is disposed between the controller and the first heat generating frame and/or between the controller and the second heat generating frame and fix the controller to the first heat generating frame and/or the controller to the second heat generating frame.

The security camera may further include a fan unit which is installed inside or outside of at least one of the first heat generating frame and the second heat generating frame.

The fan unit may be installed in parallel to or perpendicular to the controller.

The image pickup unit may include a lens bracket; a lens unit which is installed on the lens bracket and includes at least one lens; and a detection sensor which is disposed behind the lens unit and detects a light transmitted through the lens unit.

The controller may include a circuit board; and at least one device installed on the circuit board.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
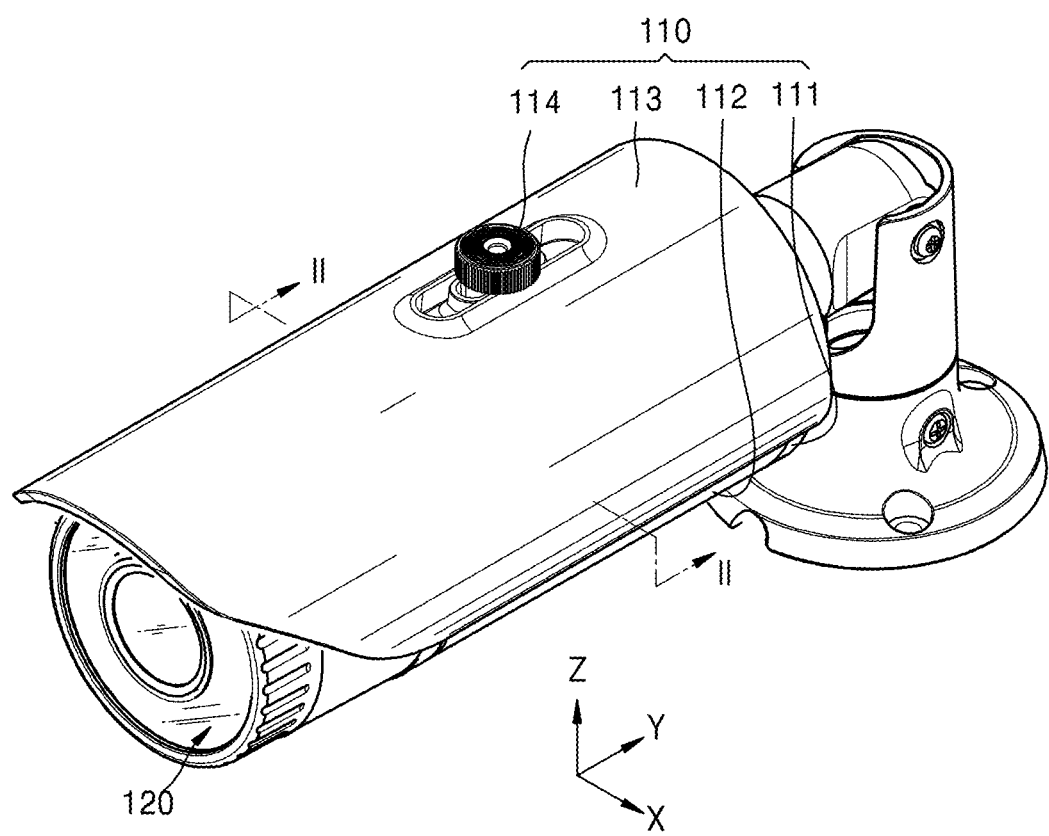
FIG. 1 is a perspective view of a security camera according to an exemplary embodiment.

Reference will now be made in detail to exemplary embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

The inventive concept will now be described more fully with reference to the accompanying drawings, in which exemplary embodiments of the inventive concept are shown. The inventive concept may, however, be embodied in many different forms and should not be construed as being limited to the embodiments set forth herein; rather, these embodiments are provided so that this disclosure will be thorough and complete, and will fully convey the inventive concept to those skilled in the art.

The terms used in the present specification are merely used to describe the exemplary embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. While such terms as "first," "second," etc., may be used to describe various components, such components must not be limited to the above terms. The above terms are used only to distinguish one component from another.

Figure 2:
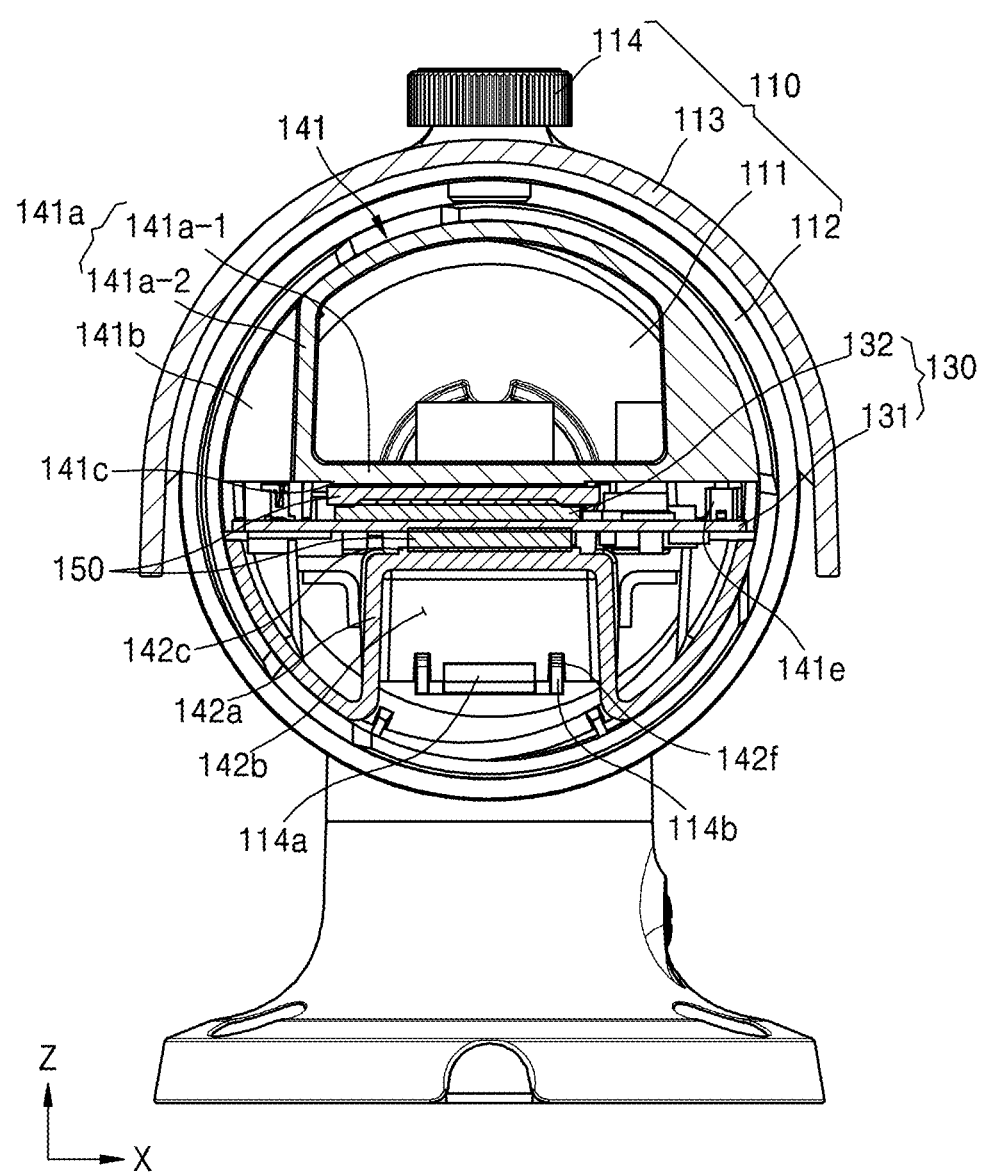
FIG. 2 is a sectional view, obtained along a line II-II of FIG. 1, according to an exemplary embodiment.
Figure 3:
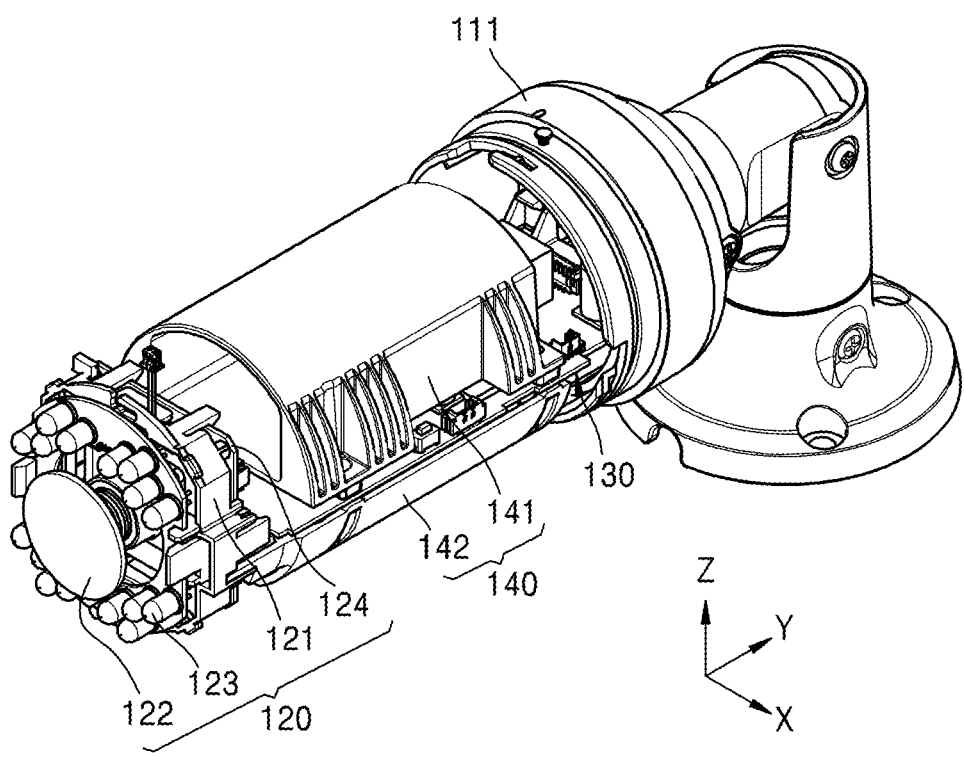
FIG. 3 is a perspective view of a portion of the security camera shown in FIG. 1, according to an exemplary embodiment.
Figure 4:
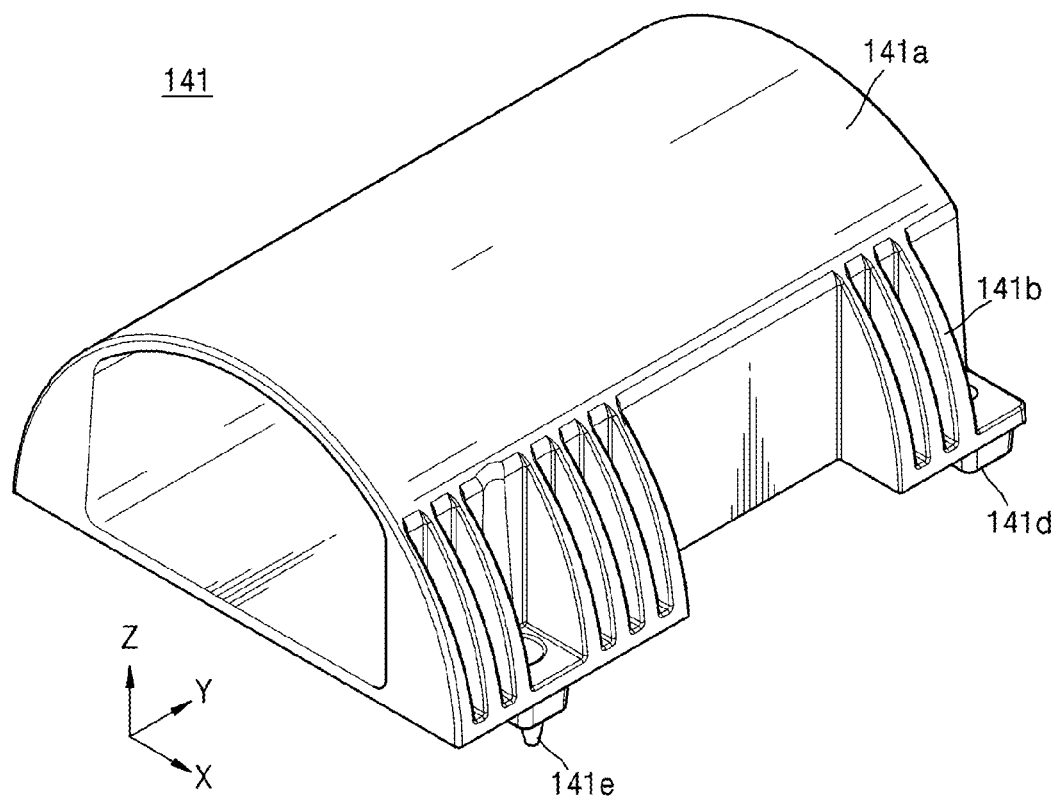
FIG. 4 is a perspective view of a first heat generating frame shown in FIG. 1, according to an exemplary embodiment.
Figure 5:
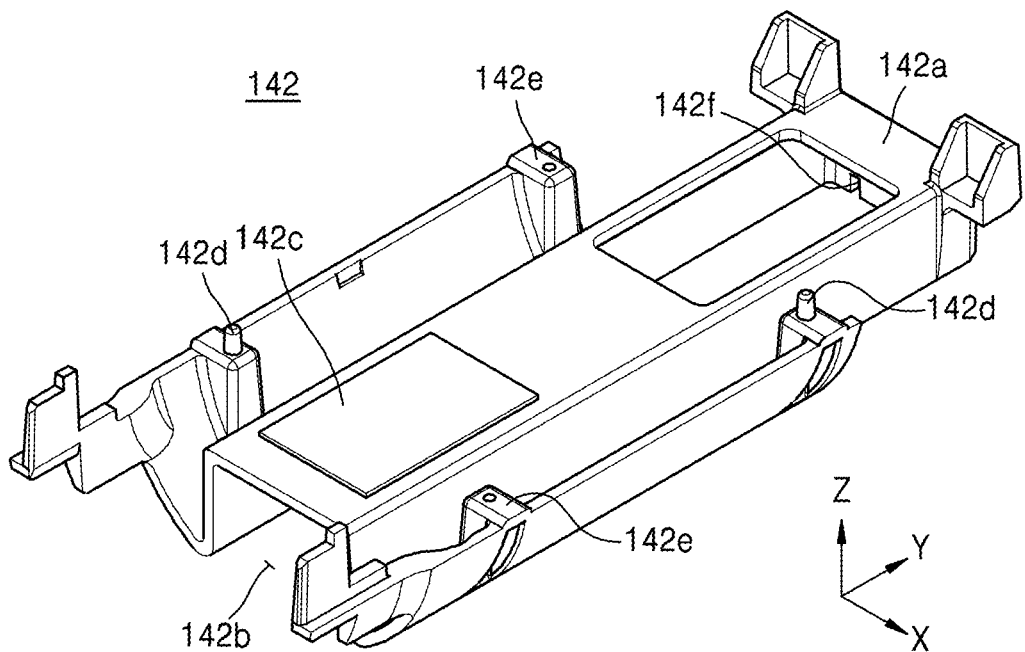
FIG. 5 is a perspective view of a second heat generating frame shown in FIG. 1, according to an exemplary embodiment.

FIG. 1 is a perspective view of a security camera according to an exemplary embodiment. FIG. 2 is a sectional view, obtained along a line II-II of FIG. 1. FIG. 3 is a perspective view of a portion of the security camera shown in FIG. 1. FIG. 4 is a perspective view of a first heat generating frame shown in FIG. 1. FIG. 5 is a perspective view of a second heat generating frame shown in FIG. 1.

Referring to FIGS. 1 through 5, the security camera 100 may be formed in various shapes. For example, the security camera 100 may be formed in a dome-like shape or a cylindrical shape. Furthermore, the security camera 100 may be formed in various shapes including a cuboidal shape, a triangular pillar-like shape, etc. However, for convenience of explanation, descriptions will be given below under an assumption that the security camera 100 is formed in a cylindrical shape.

The security camera 100 may include a housing 110, an image pickup unit 120, a controller 130, a heat generating frame 140, and a thermal pad 150. Here, the housing 110 may form the outer shell of the security camera 100, where the housing 110 may be formed as a plurality of portions and assembled to form a space therein and seal the space from outside. The housing 110 may be formed of a synthetic resin via a molding operation, for example.

The housing 110 may include a supporting housing 111, which is installed to be fixed outside the housing 110, and a cover housing 112, which forms the outer shell of the security camera 100 and forms a space inside the housing 110 by being combined with the supporting housing 111. Furthermore, the housing 110 may include a sun shield 113, which is slidably combined with the cover housing 112, and a sun shield fixing unit 114, which restricts movement of the sun shield 113.

An end of the cover housing 112 as described above may be combined with the supporting housing 111, whereas the other end may be combined with the image pickup unit 120 and fixed. Furthermore, the supporting housing 111 may include a fixing protrusion 114a for fixing the heat generating frame 140. Here, the fixing protrusion 114a may be formed in a hook-like shape to fix a portion of the heat generating frame 140. Furthermore, the supporting housing 111 may include a guiding protrusion 114b, which is formed apart from the fixing protrusion 114a. The guiding protrusion 114b may be inserted into the heat generating frame 140 and fix the heat generating frame 140 into position. Particularly, if the heat generating frame 140 is fixed to the fixing protrusion 114a, the guiding protrusion 114b may be inserted into the heat generating frame 140 and may guide the heat generating frame 140 during assembly.

The image pickup unit 120 may be arranged in front of the housing 110 and to be fixed to the housing 110. Here, the image pickup unit 120 may include a lens bracket 121, which is combined with the housing 110, and a lens unit 122, which is installed at the lens bracket 121 and includes at least one lens. Furthermore, the image pickup unit 120 may include an infrared (IR) lamp 123, which is installed around the lens unit 122 and emits an IR ray, and a detection sensor 124, which detects a light transmitted through the lens unit 122. Aside from the above-stated configuration, the image pickup unit 120 as described above may be identical or similar to an imaging unit used in a general security camera.

Meanwhile, the controller 130 may include a circuit board 131, which is installed and fixed inside the housing 110, and at least one device 132, which is installed on the circuit board 131. Here, the device 132 may be in the form of a data processing chip, such as a digital signal processor (DSP). Furthermore, the device 132 may be in the form of a general condenser or a general electronic chip.

The device 132 as described above may include a circuit board or a component that generates heat or a circuit board or a component that generates no heat or a little heat, as the security camera 100 is operated. However, for convenience of explanation, descriptions will be given below under an assumption that the circuit board does not generate heat and the device generates heat.

As described above, in case a component included in the device 132 generates significant heat, the heat generating frame 140 may contact the device 132 and exhaust heat generated from the device 132 to outside. Particular, a portion of the heat generating frame 140 corresponding to the device 132 that generates significant heat may be formed to protrude toward the device 132. Furthermore, a component that generates no heat or a little heat in the device 132 may not contact the heat generating frame 140 and may be inserted into the heat generating frame 140.

The heat generating frame 140 may include a first heat generating frame 141, which is installed to contact a first surface of the controller 130, and a second heat generating frame 142, which is installed to contact a second surface of the controller 130. Here, the first heat generating frame 141 and the second heat generating frame 142 may be formed of a material capable of absorbing heat, e.g., a metal. Furthermore, the first heat generating frame 141 and the second heat generating frame 142 may be arranged to face each other and may exhaust heat generated by the controller 130 to outside.

The first heat generating frame 141 and the second heat generating frame 142, when combined, may be formed to have a shape similar or corresponding to that of the housing 110. Here, in terms of forming the first heat generating frame 141 and the second heat generating frame 142 to have a shape similar or corresponding to that of the housing 110, a distance between the outer surface of the first heat generating frame 141 to the inner surface of the housing 110 may be constant, and a distance between the outer surface of the second heat generating frame 142 to the inner surface of the housing 110 may be constant. In detail, if the housing 110 is formed in a cylindrical shape, the first heat generating frame 141 and the second heat generating frame 142 may also be formed in a cylindrical shape when they are combined. If the housing 110 is formed in a spherical shape, the first heat generating frame 141 and the second heat generating frame 142 may also be formed in a spherical shape when they are combined. Moreover, if the housing 110 is formed in a cuboidal shape, the first heat generating frame 141 and the second heat generating frame 142 may also be formed in a cuboidal shape when they are combined. If the housing 110 is formed in a triangular pillar-like shape, the first heat generating frame 141 and the second heat generating frame 142 may also be formed in a triangular pillar-like shape when they are combined. Here, the first heat generating frame 141 and the second heat generating frame 142 may be arranged to be completely inserted into the housing 110 and may be partially inserted into the housing 110 and fixed.

The first heat generating frame 141 may include a first heat generating frame body unit 141a and at least one first heat generating pin 141b which is formed at a lateral surface of the first heat generating frame body unit 141a. Furthermore, the first heat generating frame 141 may include a first protrusion 141c, which is formed to protrude from the first heat generating frame body unit 141a toward the device 132 and is connected to the device 132 via the thermal pad 150. The first heat generating frame 141 may include a supporting unit 141d to be combined with the second heat generating frame 142 via a connecting member (not shown). Furthermore, the first heat generating frame 141 may include an insertion unit 141e formed to protrude toward the second heat generating frame 142.

The first heat generating frame body unit 141a may include a first heat generating plate 141a-1, which is formed flat and contacts the circuit board 131 or the device 132, and a first wing unit 141a-2, which is connected to the first heat generating plate 141a-1 and is formed to have a curved shape similar to that of the housing 110. Here, the first wing unit 141a-2 may be formed to correspond to at least a portion of the housing 110. Furthermore, the first wing unit 141a-2 may be formed to correspond to the entire inner surface of the housing 110. Here, the first heat generating plate 141a-1 and the first wing unit 141a-2 may be integrally formed as a single body. Furthermore, if the first wing unit 141a-2 is formed in an arched shape, a space may be formed therein. For convenience of explanation, descriptions will be given below under an assumption that a space is formed inside the first wing unit 141a-2.

The first heat generating pin 141b as described above may be installed on a surface of the first heat generating frame body unit 141a. Here, the first heat generating pin 141b may be formed in a shape similar to that of a portion of the housing 110 at which the first heat generating pin 141b is installed. In other words, the first heat generating pin 141b may be formed in a curved shape, and more particularly, an arc shape. Other than the shapes described above, the first heat generating pin 141b as described above may be formed as a protrusion on a surface of the first heat generating frame body unit 141a. Here, the plurality of first heat generating pins 141b may be formed at the first heat generating frame body unit 141a apart from one another.

The first protrusion 141c as described above may be connected to the device 132 via the thermal pad 150. Here, the first protrusion 141c may maintain firm contact between the thermal pad 150 and the device 132 by pressing the thermal pad 150 toward the device 132. In other words, if the first heat generating frame 141 is installed, a distance between the first protrusion 141c and the device 132 may be smaller than thickness of the thermal pad 150. Therefore, if the first heat generating frame 141 is installed, the first protrusion 141c may prevent the device 132 from being detached from the thermal pad 150 by pressing the thermal pad 150.

The supporting unit 141d may be formed to protrude toward the second heat generating frame 142 described below. Here, an insertion hole may be formed in the supporting unit 141d, such that the connecting member is inserted thereto. Particularly, the connecting member may include a bolt, a screw, etc.

The insertion unit 141e may be formed to protrude toward the second heat generating frame 142 and may be inserted into the second heat generating frame 142. Here, the insertion unit 141e may have a greater length than the supporting unit 141d. Furthermore, the insertion unit 141e may be formed in a tapered shape. In other words, the insertion unit 141e may be formed, such that cross-section of the insertion unit 141e perpendicular to the lengthwise direction becomes smaller in the lengthwise direction. Particularly, the insertion unit 141e may have a tapered shape, thereby adjusting a distance between the first heat generating frame 141 and the second heat generating frame 142.

Particularly, the second heat generating frame 142 may be arranged to face the first heat generating frame 141. Here, the second heat generating frame 142 may be combined with the housing 110 and support the controller 130. Furthermore, the second heat generating frame 142 may be formed in a shape similar to that of the first heat generating frame 141. For example, the second heat generating frame 142 may include a second heat generating frame body unit 142a. Here, the second heat generating frame body unit 142a may include a heat generating plate (not shown) and a second wing unit (not shown) like the first heat generating frame body unit 141a as described above, where the heat generating plate and the second wing unit may be integrally formed as a single body. Furthermore, the second wing unit may be formed to correspond to at least a portion of the housing 110 or the entire inner surface of the housing 110.

If the second wing unit is formed to correspond to the entire inner surface of the housing 110, a portion of the second wing unit may be formed as an empty space. Particularly, if the second heat generating frame 142 is formed to have an empty space therein, the second heat generating frame 142 may be effectively cooled by air flow.

The second heat generating frame body unit 142a may include a second protrusion 142c formed to protrude toward the controller 130. Here, the second protrusion 142c may contact a portion of the controller 130, which generates heat, via the thermal pad 150, like the first protrusion 141c.

An assembly groove 142b may be formed at the center of the second heat generating frame body unit 142a to be assembled with the housing 110. Particularly, the second heat generating frame body unit 142a may be formed such that two opposite sides thereof protrude from the assembly groove 142b, such that shapes of the protruding portions may be similar to the outer surface of the housing 110.

Particularly, the circuit board 131 may be accommodated at and supported by the second heat generating frame body unit 142a. Here, the second heat generating frame body unit 142a may be combined with the supporting housing 111 and support the circuit board 131.

The second heat generating frame 142 may include a second heat generating pin (not shown) formed on the outer surface of the second heat generating frame body unit 142a. Here, the second heat generating pin may be a pine protrusion and may have a shape similar to that of a general heat generating pin. However, the shape of the second heat generating pin is not limited to the above-stated shape and may include any of various shapes protruding from the second heat generating frame body unit 142a.

The second heat generating frame 142 may include a binding unit 142d, which is formed to face the supporting unit 141d of the first heat generating frame 141. Here, the binding unit 142d may be formed to protrude toward the first heat generating frame 141, where an insertion hole, to which the connecting member is to be inserted, may be formed in the binding unit 142d.

The second heat generating frame 142 may include an accommodating unit 142e, which is formed such that the insertion unit 141e of the first heat generating frame 141 is inserted thereto. Here, the accommodating unit 142e may be formed to protrude toward the first heat generating frame 141, and an insertion hole may be formed in the accommodating unit 142e, such that the insertion unit 141e is to be inserted thereto. Here, the insertion hole may be formed in a cylindrical shape to prevent the insertion unit 141e from being inserted deeper than a designated length.

The supporting unit 141d of the first heat generating frame 141, the binding unit 142d of the second heat generating frame 142, the insertion unit 141e of the first heat generating frame 141, and the accommodating unit 142e of the second heat generating frame 142 as described above may be formed on different heat generating frames, respectively. For example, the supporting unit 141d and the insertion unit 141e of the first heat generating frame 141 may be formed at the second heat generating frame 142, whereas the binding unit 142d and the accommodating unit 142e of the second heat generating frame 142 may be formed at the first heat generating frame 141. However, for convenience of explanation, descriptions will be given below under an assumption that the supporting unit 141d and the insertion unit 141e are formed at the first heat generating frame 141 and the binding unit 142d and the accommodating unit 142e are formed at the second heat generating frame 142.

Meanwhile, in a method of manufacturing the security camera 100 as described above, the housing 110 may be fabricated and prepared first. The supporting housing 111 may be installed to be fixed to an outside object or a connecting member to be combined with an outside object.

While or after the above-stated operation is performed, the thermal pad 150 may be arranged on the second heat generating frame 142, and then the circuit board 131 may be arranged. Furthermore, after the thermal pad 150 is further arranged on the device 132 on the circuit board 131, the first heat generating frame 141 may be arranged. Here, the first heat generating frame 141 and the second heat generating frame 142 may connect and fix the supporting unit 141d to the binding unit 142d via the connecting member. Furthermore, the insertion unit 141e may be inserted to the second heat generating frame 142 and maintain a distance between the first heat generating frame 141 and the second heat generating frame 142. The plurality of supporting units 141d and the plurality of binding units 142d as described above may be arranged diagonally to each other on the first heat generating frame 141 and the second heat generating frame 142, respectively. Furthermore, the plurality of insertion units 141e and the plurality of accommodating units 142e as described above may be arranged diagonally to each other on the first heat generating frame 141 and the second heat generating frame 142, respectively.

The heat generating frame 140 assembled as described above and the controller 130 may be installed at the supporting housing 111. Here, two end portions of the second heat generating frame body unit 142a may be formed to be bent perpendicular to the lengthwise direction. Particularly, these two end portions of the second heat generating frame body unit 142a as described above may be inserted and fixed between the fixing protrusion 114a and the supporting housing 111. Here, a guiding protrusion inserting groove 142f, to which the guiding protrusion 114b is to be inserted, is formed at the end portion of the second heat generating frame body unit 142a, and the guiding protrusion 114b is inserted to the guiding protrusion inserting groove 142f. Therefore, the second heat generating frame body unit 142a may be accommodated. Particularly, in the above-stated case, the inner surface of the supporting housing 111 may be arranged perpendicular to the second heat generating frame body unit 142a. Therefore, to prevent the second heat generating frame body unit 142a from being bent downward, the end portion of the second heat generating frame body unit 142a may be fixed to the supporting housing 111 via a bolt, a pin, a screw, etc.

After the above-stated operations, the cover housing 112 and the lens unit 122 may be installed, thereby completely sealing the security camera 100. Here, the sun shield 113 and the sun shield fixing unit 114 may be installed at the cover housing 112.

Meanwhile, the security camera 100 manufactured as described above may be installed at an outside structure or an outside object. Here, the security camera 100 may capture an outside image and transmit the captured image to an external device (not shown) connected to the security camera 100.

Particularly, an image of an outside landscape or an outside motion may be captured by the image pickup unit 120 and transmitted to the controller 130. Here, the controller 130 may control the image pickup unit 120 or an external driving device.

If the controller 130 operates as described above, at least one from between the circuit board 131 and the device 132 of the controller 130 may generate heat. Here, the heat may be absorbed by the first heat generating frame 141 and the second heat generating frame 142.

Here, the heat may be exhausted to outside via the first heat generating frame body unit 141a and the second heat generating frame body unit 142a. Furthermore, heat transmitted through the first heat generating frame body unit 141a and the second heat generating frame body unit 142a may be exhausted to outside via the first heat generating pin 141b and the second heat generating pin, and more particularly, may be transmitted to the housing 110.

As the heat is transmitted through the housing 110 and is exchanged with outside due to an air flow, heat transmitted via the first heat generating frame 141 and the second heat generating frame 142 may be effectively exhausted to outside.

Therefore, the security camera 100 may minimize malfunction or failure due to heat generated therein as the heat generating frame 140 immediately absorbs heat generated by the controller 130 and exhausts the heat to outside the housing 110.

Furthermore, the security camera 100 may minimize heat insulation effect caused by an air layer between the heat generating frame 140 and the housing 110 by forming the heat generating frame 140 in a shape similar to that of the housing 110 and minimizing a distance between the outer surface of the heat generating frame 140 and the inner surface of the housing 110.

Furthermore, the security camera 100 may support the controller 130 via the second heat generating frame 142, thereby simplifying the overall structure and improving productivity.

Figure 6:
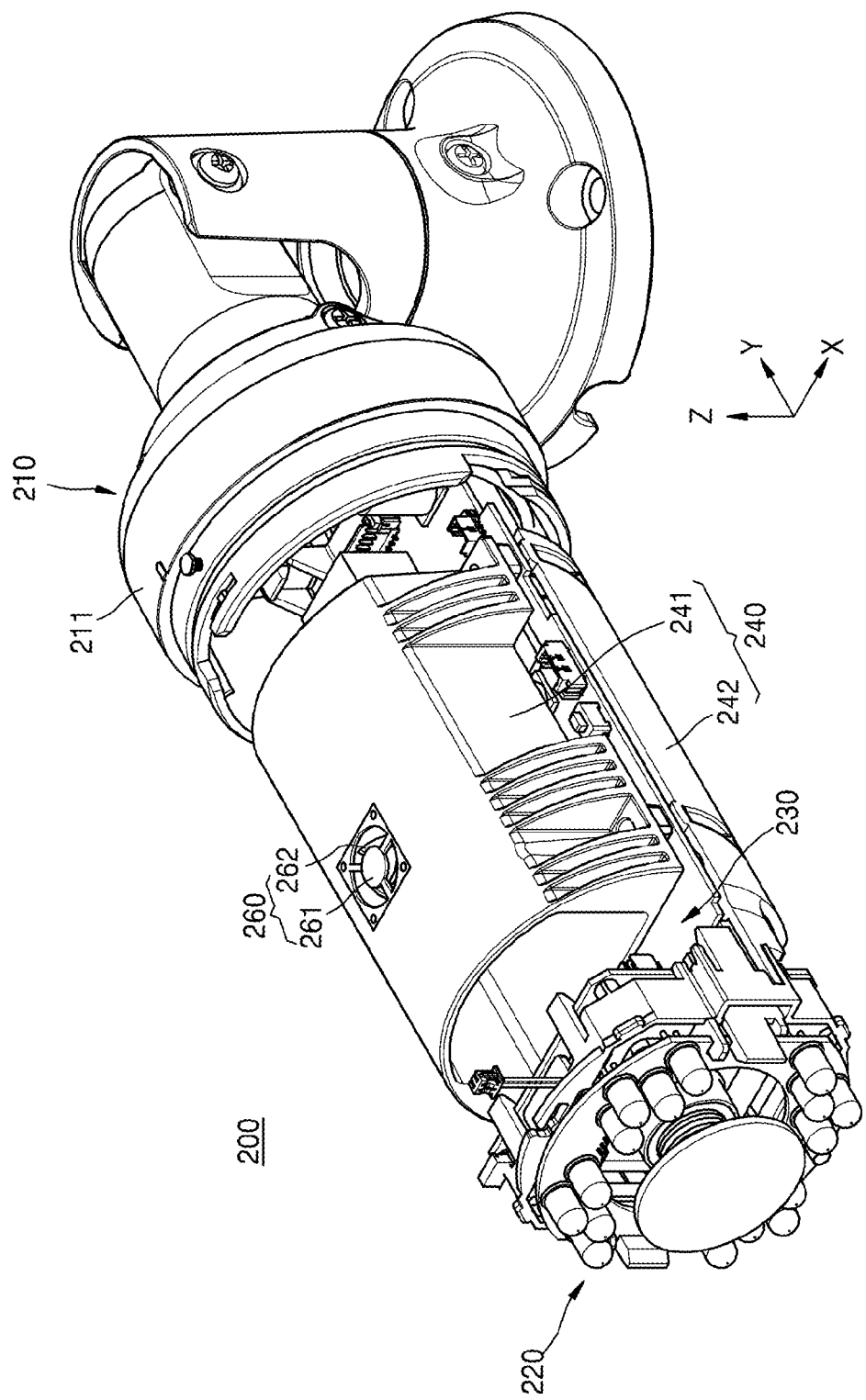
FIG. 6 is a perspective view of a portion of a security camera according to another exemplary embodiment.

FIG. 6 is a perspective view of a portion of a security camera 200 according to another exemplary embodiment.

Referring to FIG. 6, the security camera 200 may include a housing 210, an image pickup unit 220, a controller 230, a heat generating frame 240, a thermal pad (not shown), and a fan unit 260. Here, since the housing 210, the image pickup unit 220, the controller 230, the heat generating frame 240, and the thermal pad are similar or identical to the housing 110, the image pickup unit 120, the controller 130, the heat generating frame 140, and the thermal pad 150 as described above with reference to FIGS. 1 through 5, detailed descriptions thereof will be omitted.

The fan unit 260 may be installed at the heat generating frame 240. Particularly, the fan unit 260 may be installed at at least one from between the first heat generating frame 241 and the second heat generating frame 242. Here, since the fan unit 260 is installed at a similar location of the first heat generating frame 241 or the second heat generating frame 242 in a similar manner, descriptions below will focus on a case in which the fan unit 260 is installed at the first heat generating frame 241.

The fan unit 260 may include a fan housing 261 installed at the first heat generating frame 241, a fan 262 rotatably installed at the fan housing 261, and a fan driving unit (not shown), which is connected to the fan 262 and drives the fan 262. Here, the fan driving unit may include a general motor. The fan driving unit may operate by being connected to the controller 230 via a connector.

The fan unit 260 as described above may be installed at various locations of the first heat generating frame 241. For example, the fan unit 260 may be installed on the top of the first heat generating frame 241. Here, the fan unit 260 may be arranged to be parallel to the controller 230. Furthermore, a flow hole may be formed in a cover housing (not shown), such that air exhausted from the fan unit 260 passes therethrough. Particularly, an installation hole may be formed at a portion of the first heat generating frame 241 at which the fan unit 260 is installed, such that the interior space communicates with outside.

Other than the above-stated case, the fan unit 260 may be installed at the first heat generating frame 241 to be close to the image pickup unit 220. Here, the fan unit 260 may be arranged to be perpendicular to the controller 230. Furthermore, the fan unit 260 may move air in the interior space of the first heat generating frame 241 in the lengthwise direction of the first heat generating frame 241. In other words, the fan unit 260 may circulate air inside the first heat generating frame 241 from the image pickup unit 220 to a supporting housing 211. Other than the above-stated case, the fan unit 260 may be installed at a lateral surface of the first heat generating frame 241. Here, a hole may be formed in the supporting housing, such that air exhausted by the fan unit 260 passes therethrough.

Meanwhile, the security camera 200 as described above may be assembled as described above with reference to FIGS. 1 through 5. Here, the assembled security camera 200 may be installed at an object or a particularly location.

When the security camera 200 installed as described above is operated, the controller 230 may generate heat as described above. Here, heat generated by the controller 230 may be absorbed via at least one of the first heat generating frame 241 and the second heat generating frame 242.

Here, the fan unit 260 may rotate at a constant speed and circulate the air inside the housing 210 or exhaust the air to outside of the housing 210. According to another exemplary embodiment, the fan unit 260 may be operated to rotate at variable speeds, based on a temperature inside the housing 210, a set time, a set temperature, etc. Particularly, if the fan unit 260 operates in response to a temperature sensor (not shown) inside the housing 210, the temperature sensor may be arranged inside the housing 210 and a temperature inside the housing 210 measured by the temperature sensor may be transmitted to the controller 230. Here, if the temperature inside the housing 210 is equal to or higher than a pre-set temperature, the controller 230 may operate the fan unit 260. Furthermore, the controller 230 may control operations of the fan unit 260 based on a pre-set related equation or a rotation speed table according to the temperature inside the housing 210 measured by the temperature sensor. Here, the temperature sensor may measure temperature of the heat generating frame 240 and the controller 230 may control the fan unit 260. However, for convenience of explanation, descriptions below will focus on a case in which the fan unit 260 rotates at a constant speed.

If the fan unit 260 operates as described above, an air flow may be formed as the fan unit 260 operates, and air may be exhausted to outside via the housing 210. Here, the first heat generating frame 241 and the second heat generating frame 242 may be cooled by the air flow as described above, thereby lowering temperature inside the housing 210 and temperature of the controller 230.

Therefore, the security camera 200 may prevent a malfunction or a failure due to an increased temperature by effectively eliminating heat generated during an operation of the security camera 200.

Figure 7:
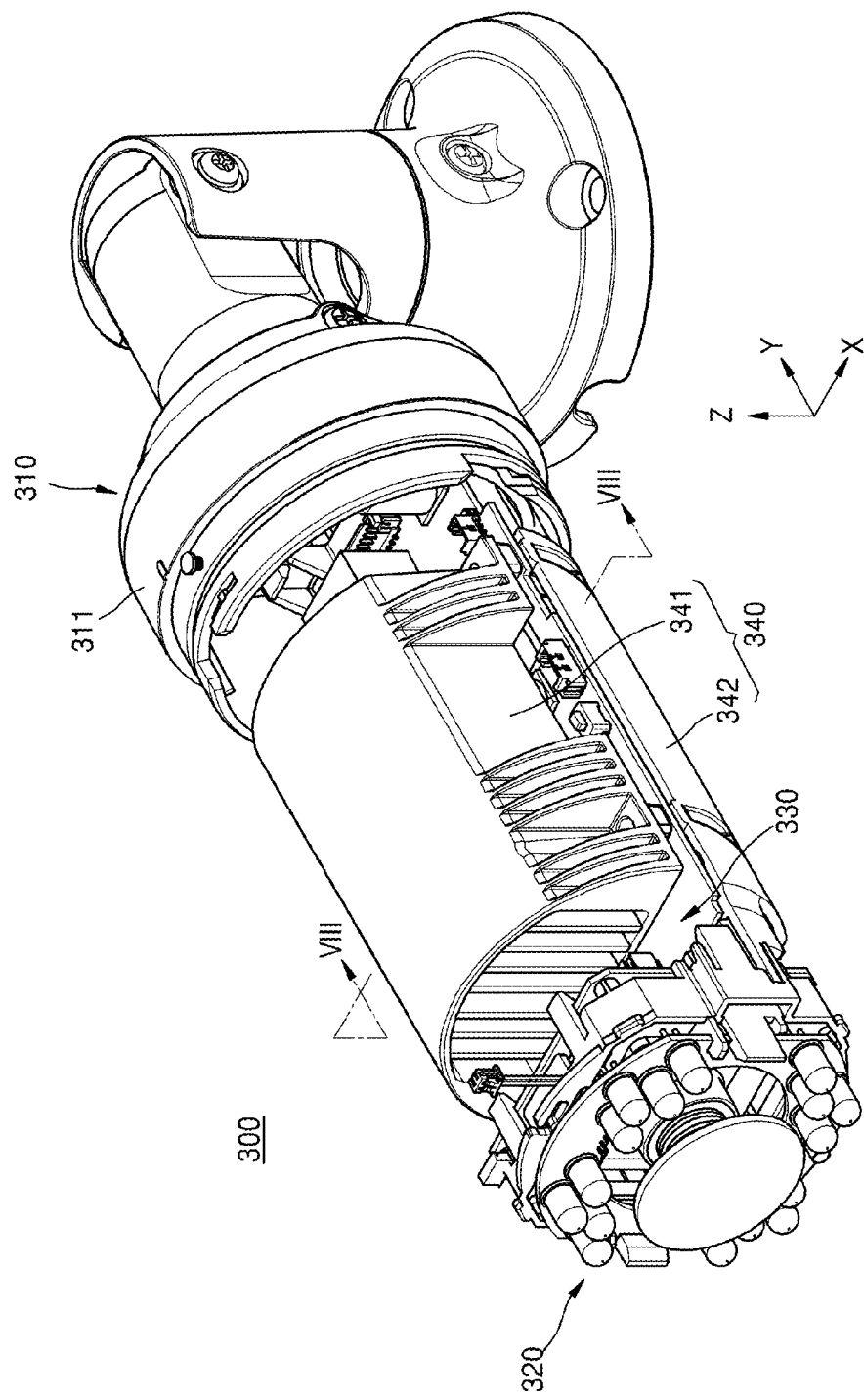
FIG. 7 is a perspective view of a portion of a security camera according to another exemplary embodiment.
Figure 8:
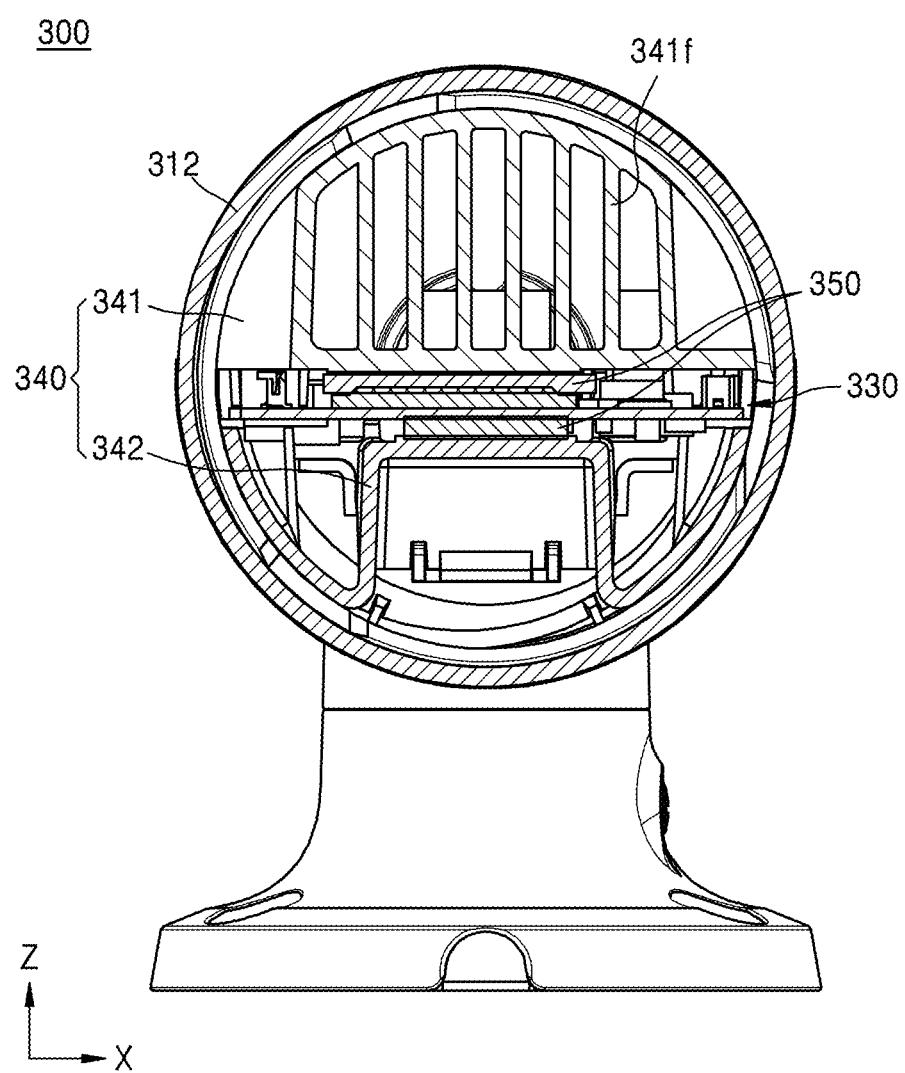
FIG. 8 is a sectional view, obtained along a line VIII-VIII of FIG. 7, according to an exemplary embodiment.

FIG. 7 is a perspective view of a portion of a security camera 300 according to another exemplary embodiment. FIG. 8 is a sectional view, obtained along a line VIII-VIII of FIG. 7.

Referring to FIGS. 7 and 8, the security camera 300 may include a housing 310, an image pickup unit 320, a controller 330, a heat generating frame 340, and a thermal pad 350. Here, the housing 310, the image pickup unit 320, the controller 330, and the thermal pad 350 are identical or similar to the housing 110, the image pickup unit 120, the controller 130, and the thermal pad 150 as described above with reference to FIGS. 1 through 5, detailed descriptions thereof will be omitted.

Holes may be formed to penetrate through a first heat generating frame 341 and a second heat generating frame 342, as described above. Here, at least one of the first heat generating frame 341 and the second heat generating frame 342 may include a rib (not shown) formed across the hole. Particularly, the first heat generating frame 341 may include a first rib 341f, whereas the second heat generating frame 342 may include a second rib (not shown). However, for convenience of explanation, descriptions below will focus on a case in which the first heat generating frame 341 includes the first rib 341f.

The first rib 341f as described above may connect a surface of the first heat generating frame 341 to another surface of the first heat generating frame 341. In detail, a surface of the first heat generating frame 341 connected to the controller 330 may be connected to another surface of the first heat generating frame 341 nearby the housing 310. Furthermore, the plurality of first ribs 341f may be arranged apart from one another in the interior space of the first heat generating frame 341.

The first rib 341f as described above may become a heat transmission path for transmitting heat generated by controller 330 to the surrounding of the housing 310. Particularly, even if there is no air flow inside the first heat generating frame 341, the first rib 341f may transmit heat generated by the 330 to the surroundings of the housing 310.

Therefore, the security camera 300 may prevent a malfunction or a failure due to an increased temperature by effectively eliminating heat generated during an operation of the security camera 300.

FIGS. 9A to 9F show results of simulation of heat generation characteristics of a security camera in the related art and security cameras according to exemplary embodiments. Hereinafter, reference numerals same as those given above denote like the same elements as denoted above.

Figure 9A:
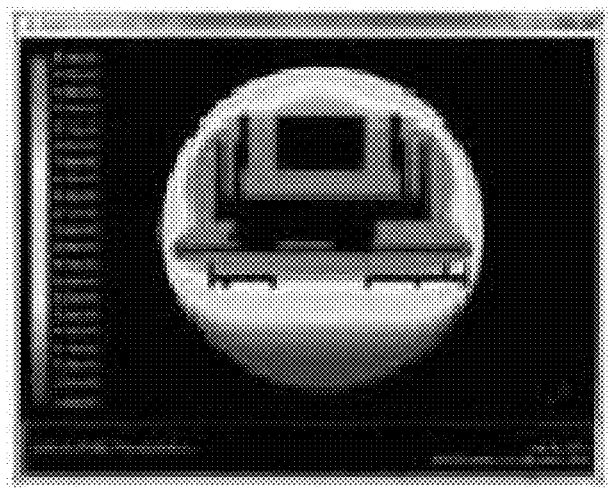
FIGS. 9A to 9F show results of simulation of heat generation by a security camera in the related art and security cameras according to exemplary embodiments.
Figure 9B:
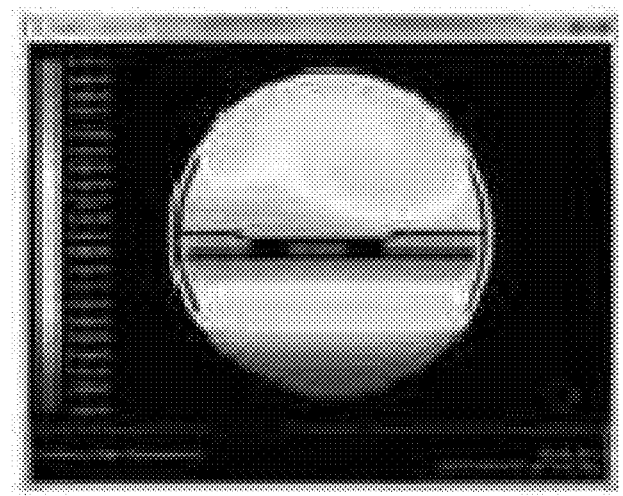

FIGS. 9B to 9F show security cameras 100, 200, and 300 according to the above exemplary embodiments. On the contrary, FIG. 9A shows a security camera of a related art. Here, in FIGS. 9A to 9F, the closer to black the color of an area is, the higher the temperature of the area is. Furthermore, the lighter the color of an area is, the lower the temperature of the area is.

Referring to the results, the center of FIG. 9A is indicated with dark colors, and thus it is clear that significant heat is generated. However, if first heat generating frames 141, 241, and 341 and second heat generating frames 142, 242, and 342 are installed as in the above exemplary embodiments, temperatures of the center portions in which circuit boards 131, 231, and 331 and devices 132, 232, and 332 are arranged are relatively low.

Figure 9C:
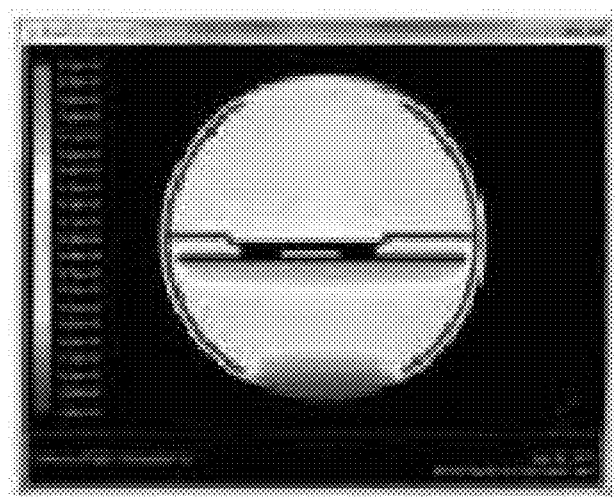
Figure 9D:
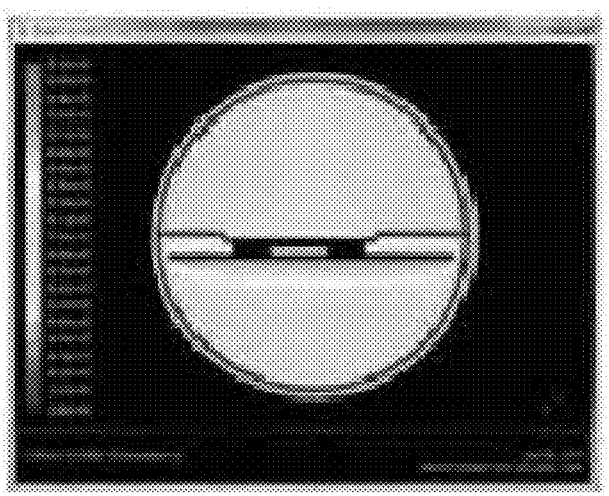
Figure 9E:
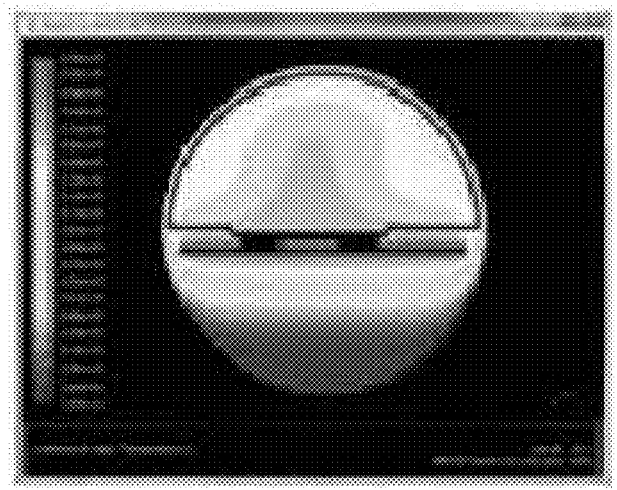
Figure 9F:
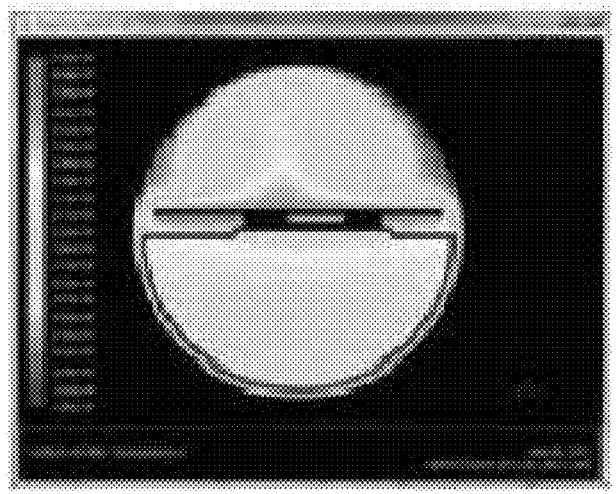

Particularly, the larger the portions of housings 110, 210, and 310 corresponding to the first heat generating frames 141, 241, and 341 and the second heat generating frames 142, 242, and 342 become (in other words, the larger the first wing unit (not shown) and the second wing unit (not shown) become), the more the temperatures at the center portions corresponding to the circuit boards 131, 231, and 331 and the devices 132, 232, and 332 decrease. In other words, the center portion of FIG. 9C is brighter than the center portion of FIG. 9B, and thus heats from the circuit boards 131, 231, and 331 and the devices 132, 232, and 332 are more actively exhausted. Furthermore, comparing FIG. 9D, FIG. 9E, and FIG. 9F to one another, the center portion of FIG. 9D is brighter than those of FIGS. 9E and 9F, heat exhausting efficiency is higher in a case where both the first wing unit and the second wing unit are arranged.

Therefore, the security cameras 100, 200, and 300 may effectively exhaust heats generated by the circuit boards 131, 231, and 331 and the devices 132, 232, and 322 to outside of the housings 110, 210, and 310 via radiation and conduction even if the housings 110, 210, and 310 are sealed.

As described above, according to the exemplary embodiments, efficient cooling may be achieved in a security camera.

It should be understood that the exemplary embodiments described herein should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. A security camera comprising:
an image detection sensor which is configured to capture an image;
a controller which is connected to the image detection sensor and configured to process the image captured by the image detection sensor;
a first heat generating frame comprising a first protrusion portion facing a surface of the controller, the first protrusion portion being in contact with the surface of the controller; and
a second heat generating frame which is arranged to face the first heat generating frame and comprising a second protrusion portion facing another surface of the controller, the second protrusion portion being in contact with the another surface of the controller.

2. The security camera of claim 1, wherein the second heat generating frame comprises an assembly groove, which is formed by recessing a portion of the second heat generating frame, to allow a hand of a worker or an assembly tool to be inserted.

3. The security camera of claim 1, wherein one of the first heat generating frame and the second heat generating frame comprises an insertion unit, which is formed to protrude toward the other one of the first heat generating frame and the second heat generating frame; and
wherein the other one of the first heat generating frame and the second heat generating frame comprises an accommodating unit into which a portion of the insertion unit is inserted and accommodated.

4. The security camera of claim 3, wherein the insertion unit is formed to have a tapered shape.

5. The security camera of claim 4, wherein the accommodation unit is formed to have a hole-like shape into which the insertion unit is to be inserted, and
wherein a size of the insertion unit is different from a size of the accommodating unit.

6. The security camera of claim 1, wherein at least one of the first heat generating frame and the second heat generating frame comprises a heat generating pin protruding from a surface of at least one of the first heat generating frame and the second heat generating frame, respectively.

7. The security camera of claim 1, further comprising a housing which is installed to surround the first heat generating frame and the second heat generating frame.

8. The security camera of claim 7, wherein an outer surface of a portion of the first heat generating frame and an inner surface of the housing and/or an outer surface of a portion of the second heat generating frame and the inner surface of the housing may be formed to be similar to one another such that at least one of a distance between the housing and the portion of the first heat generating frame and a distance between the housing and the portion of the second heat generating frame is constant.

9. The security camera of claim 7, wherein the housing comprises:
a supporting housing which is installed to be fixed to an outer surface of the housing; and
a cover housing which is combined with the supporting housing.

10. The security camera of claim 9, wherein the supporting housing comprises a fixing protrusion into which a portion of the first heat generating frame and the second heat generating frame is inserted and fixed.

11. The security camera of claim 9, wherein the supporting housing comprises a guiding protrusion which is configured to guide movement of the first heat generating frame and the second heat generating frame when the supporting housing and the first heat generating frame and the second heat generating frame are assembled.

12. The security camera of claim 9, wherein the housing further comprises a sun shield which is slidably installed on the cover housing.

13. The security camera of claim 12, wherein the housing further comprises a sun shield fixing unit which is selectively combined with the sun shield and the cover housing and configured to restrict movement of the sun shield.

14. The security camera of claim 7, wherein the second heat generating frame is installed to be fixed to the housing and supports the controller.

15. The security camera of claim 1, wherein a hole is formed to penetrate through at least one of the first heat generating frame and the second heat generating frame, and
wherein at least one of the first heat generating frame and the second heat generating frame comprises a rib formed across the hole.

16. The security camera of claim 1, further comprising a thermal pad which is disposed between the controller and the first protrusion portion of the first heat generating frame and between the controller and the second protrusion portion of the second heat generating frame and fixes the controller to the first heat generating frame and/or the controller to the second heat generating frame.

17. The security camera of claim 1, further comprising a fan unit which is installed inside or outside of at least one of the first heat generating frame and the second heat generating frame.

18. The security camera of claim 17, wherein the fan unit is installed in parallel to or perpendicular to the controller.

19. The security camera of claim 1, further comprising:
a lens bracket; and
a lens unit which is installed on the lens bracket and comprises at least one lens,
wherein the image detection sensor is disposed behind the lens unit and configured to detect a light transmitted through the lens unit.

20. The security camera of claim 1, wherein the controller comprises:
a circuit board; and
at least one device installed on the circuit board.

* * * * *